United States Patent [19]

Mehoudar

[11] 4,427,174

[45] Jan. 24, 1984

[54] IRRIGATION SYSTEM FLUSHING VALVE

[75] Inventor: Raphael Mehoudar, Tel-Aviv, Israel

[73] Assignee: Hydro-Plan Engineering Ltd., Tel Aviv, Israel

[21] Appl. No.: 286,355

[22] Filed: Jul. 23, 1981

[30] Foreign Application Priority Data

Aug. 6, 1980 [IL] Israel .................................. 60774

[51] Int. Cl.³ ................................................ G05D 7/01
[52] U.S. Cl. ........................................ 251/16; 137/494
[58] Field of Search .......................... 137/494, 624.11; 239/542; 251/16

[56] References Cited

U.S. PATENT DOCUMENTS

| | | | |
|---|---|---|---|
| 1,768,305 | 6/1930 | Bentley | 251/16 |
| 3,107,079 | 10/1963 | Meddock | 251/16 |
| 3,773,073 | 11/1973 | Brown | 251/16 X |

Primary Examiner—Robert G. Nilson
Attorney, Agent, or Firm—Browdy and Neimark

[57] ABSTRACT

An irrigation system flushing valve comprising a housing, a coupling inlet of said housing for coupling to an end of an irrigation line, a flushing valve outlet of said housing, a valve seating formed in said housing communicating with said inlet and with said outlet, valve obturating means juxtaposed with respect to said seating and displaceable with respect thereto from a sealing position wherein said inlet is closed with respect to said outlet to an open position wherein said inlet communicates with said outlet; an extensible membrane mounted in said housing and defining with said obturating means a valve enclosure located within said housing and sealed with respect to said outlet by said obturating means and flow restricting means effecting flow communication between said inlet and said valve enclosure; the arrangement being such that the hydraulic pressures in said valve enclosure and said inlet respectively act on opposite surfaces of said obturating means and when the hydraulic pressure in said valve enclosure equals or exceeds that in said inlet said obturating means is biased into said sealing position.

9 Claims, 3 Drawing Figures

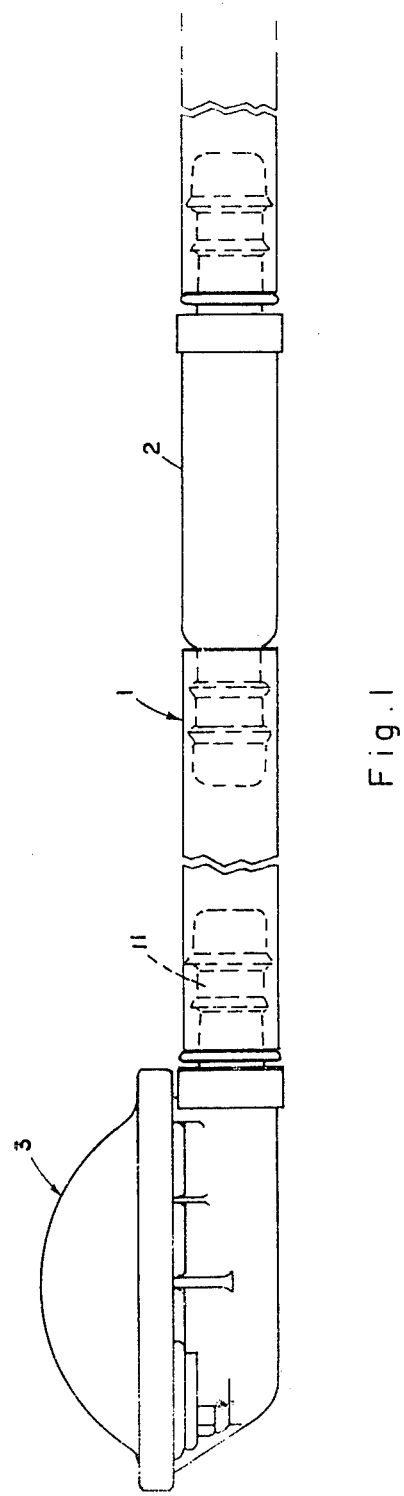

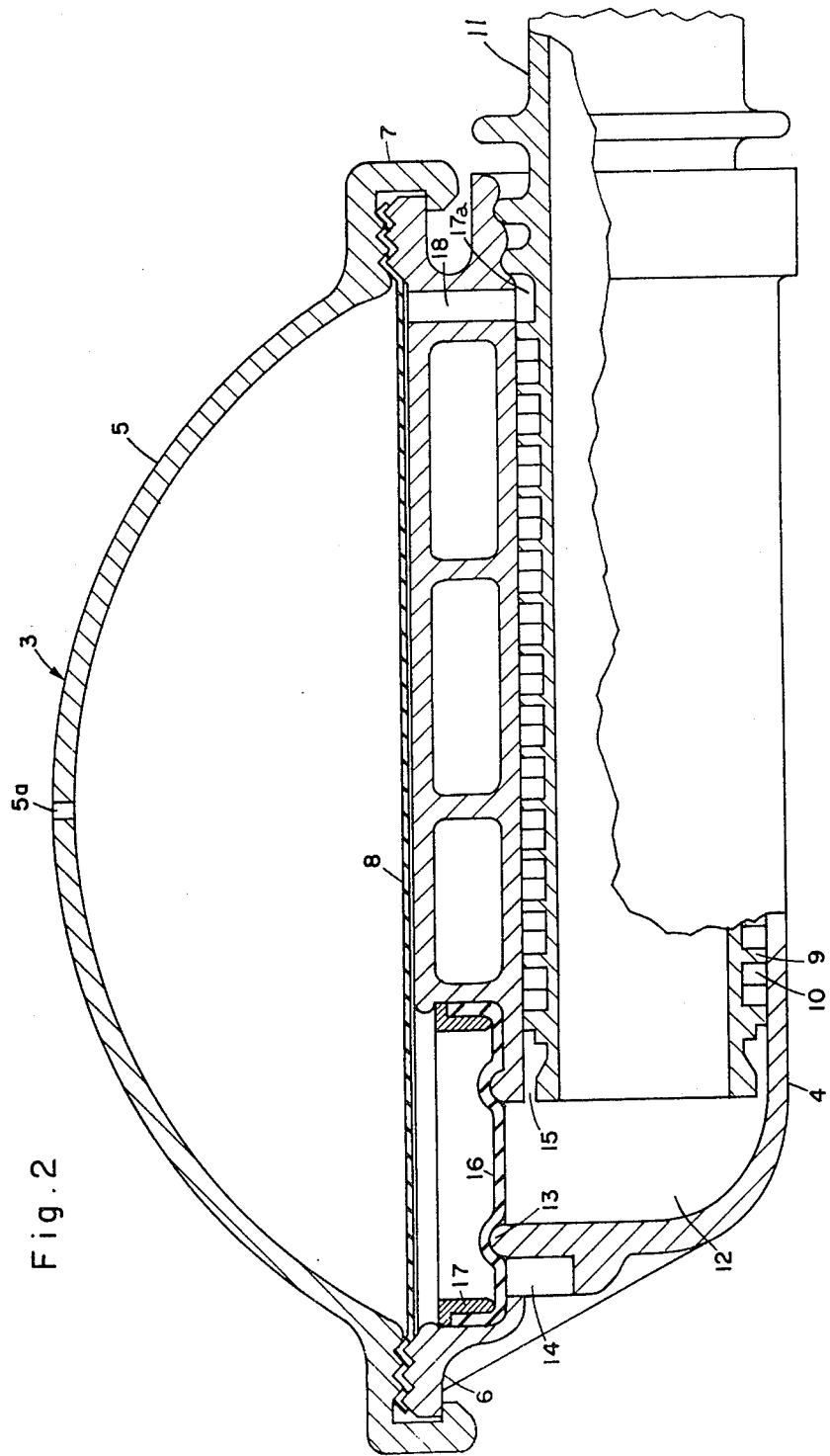

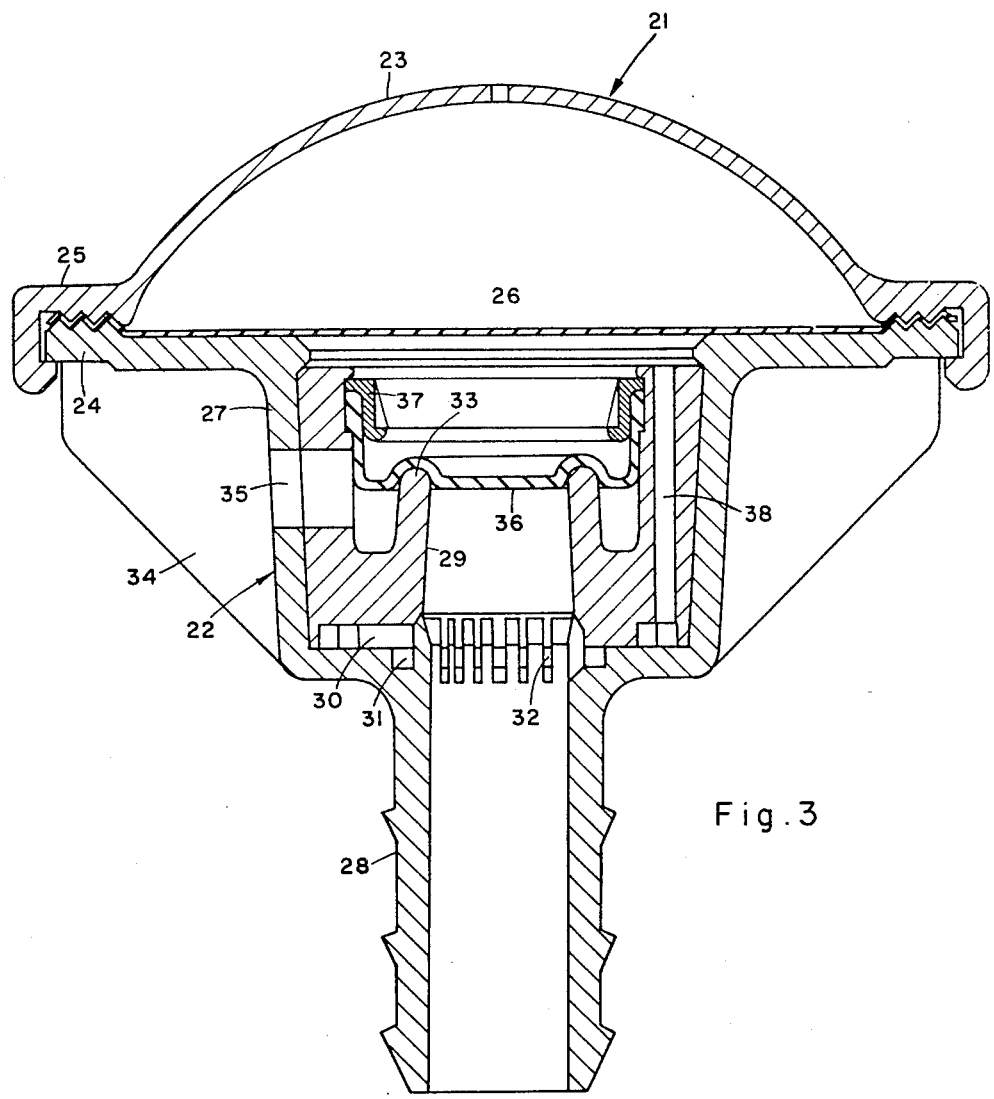

IRRIGATION SYSTEM FLUSHING VALVE

This invention relates to an irrigation system flushing valve. Irrigation systems, and in particular drip irrigation systems are in many cases provided with flushing valves in an attempt to ensure that accumulated sediment or other solids are periodically flushed out of the system thereby ensuring that the system and, in particular, drip openings thereof do not become blocked.

Two main types of flushing valves have been hitherto proposed for this purpose. In a first type, such as for example that disclosed in U.S. patent Ser. No. 4,022,244 (Oman), the flushing valve is connected to a remote end of an irrigation line so as to be normally open, as long as the irrigation pressure in the line is below say, the nominal line pressure. As soon as the water pressure in the line reaches the nominal line pressure, the line closes. With such a flushing valve therefore, and as long as the pressure in the line has not reached the nominal line pressure, the valve is open and the water flowing in the line is flushed out through the flushing valve. As soon as the nominal line pressure is attained the valve closes. Such flushing valves have several disadvantages in practice. Thus, on the one hand they remain open as long as the nominal line pressure has not been reached and should, for any reason, the attainment of this pressure be delayed or prevented, the open flushing valve gives rise to a continuous leakage away of the water from the line. Furthermore, the valve is only opened for flushing when the line pressure is relatively low and such a relatively low line pressure may not be totally effective in flushing away sediment or other solids. Once the line pressure reaches the nominal value at which effective flushing could possibly take place, the valve immediately closes.

In an attempt to overcome these disadvantages inherent in this first type of known flushing valve, it has been proposed, in a second type of flushing valve, to couple the flushing valves of the system to a pilot installation, means being provided for periodically opening the flushing valves for flushing by the introduction of pressurized pilot water to the valves via the remotely controlled pilot installation. One example of this second type of flushing valve is disclosed, for example, in U.S. patent specification Ser. No. 4,031,915 (McElhoe et al). It will be readily appreciated that the provision of such a pilot installation and the control system therefor renders the irrigation installation as a whole more complicated and expensive and open to damage and failure.

It is therefore an object of the present invention to provide a new and improved irrigation system flushing valve in which the above referred to disadvantages are substantially reduced or overcome.

According to the present invention there is provided an irrigation system flushing valve comprising a housing, a coupling inlet of said housing for coupling to an end of an irrigation line, a flushing valve outlet of said housing, a valve seating formed in said housing communicating with said inlet and with said outlet, valve obturating means juxtaposed with respect to said seating and displaceable with respect thereto from a sealing position wherein said inlet is closed with respect to said outlet to an open position wherein said inlet communicates with said outlet; an extensible membrane mounted in said housing and defining with said obturating means a valve enclosure located within said housing and sealed with respect to said outlet by said obturating means and flow restricting means effecting flow communication between said inlet and said valve enclosure; the arrangement being such that the hydraulic pressures in said valve enclosure and said inlet respectively act on opposite surfaces of said obturating means and when the hydraulic pressure in said valve enclosure equals or exceeds that in said inlet said obturating means is biased into said sealing position.

Thus, with an irrigation system flushing valve in accordance with the present invention, with initial opening of the line to which the valve is coupled to water flow flushing water flows from the line through the inlet to the outlet. Such flushing flow takes place irrespective of the magnitude of the line pressure. However, as the flow continues, a portion thereof passes through the flow restricting means into the valve enclosure defined between the membrane and the obturating means, the membrane extends thereby steadily increasing the volume of the enclosure and the pressure therein and when, after a time delay, the hydraulic pressure in the valve enclosure equals that in the line, the valve obturating means is displaced into its sealing position and the flushing through-flow ceases.

Thus it is ensured, on the one hand, that a flushing throughflow is always obtained even though the initial pressure in the line is, in fact, the nominal line pressure seeing that the provision of the flow restricting means ensures that the valve closes only after a time delay. On the other hand, it is ensured that even if the line pressure is significantly below the nominal line pressure the valve closes so as to prevent continuous flushing of the line after a similar time delay.

For a better understanding of the present invention and to show how the same may be carried out in practice reference will now be made to the accompanying drawings in which:

FIG. 1 is a side elevation of an irrigation line and flushing valve in accordance with the present invention;

FIG. 2 is a longitudinally sectioned view of the flushing valve shown in FIG. 1, on an enlarged scale; and FIG. 3 is a longitudinally sectioned view of a modified form of flushing valve in accordance with the present invention.

As seen in FIG. 1 of the drawings, an irrigation line 1 having a plurality of in-line drip emitter units 2 is coupled at a downstream end thereof to a flushing valve 3. As can be seen in detail in FIG. 2 of the drawings the valve 3 comprises a tubular housing component 4 and a dome-shaped housing component 5 having a venting aperture 5a, the components when assembled are retained together by interengaging flanges 6 and 7. Retained between the flanges 6 and 7 is a resiliently flexible membrane 8.

Friction fitted in the tubular housing component 4 is a tubular element 9 having a peripheral groove 10 with a coupling nipple 11. The tubular element 10 defines with the surrounding wall of the tubular housing component 4 a flow restricting flowpath and is essentially of the form of the inner tubular element of in-line drip emitter units such as, for example, described in U.S. Pat. Nos. 3,604,728 & 4,215,822.

A housing end region 12 of the housing component 4, located adjacent an outlet end of the tubular element 9 is formed with an annular valve seating 13 adjacent a valve outlet 14. The housing end region 12 communicates with an inlet 15 of the flow restricting flowpath. A flexible disc 16 (constituting valve obturating means) is juxtaposed with respect to the valve seating 13 and is clamped at its peripheral edges to the flanged end 6 of the tubular housing 4 by means of a clamping collar 17.

An outlet end 17a of the flowpath communicates, via a throughgoing bore 18, formed in a wall of the tubular housing component 4, with the region (constituting a valve enclosure) between the membrane 8, the adjacent surface of the tubular housing component 4 and the flexible disc 16.

In use, and with the flushing valve 3 coupled to a drip irrigation line 1 as shown in FIG. 1 of the drawings upon the opening of the line 1 for irrigation there takes place a flushing through-flow of water from the line through the valve and out of the valve outlet 14. At the same time however some of the water passes from the end region 12 and via the inlet 15, the flow restricting flowpath, outlet 17a and bore 18 into the valve enclosure between the membrane 8 and the adjacent wall of the tubular housing component 4 causing the extension of the membrane, the increase in volume of the enclosure and the steady increase in hydraulic pressure therein. When the hydraulic pressure built up in this enclosure corresponds to the hydraulic pressure in the end region 12, the disc 16 is sealingly biased against the valve seating 13 and in consequence throughflow of water to the flushing outlet 14 ceases.

Thus the sealing displacement of the disc 16 may take place, with a relatively low line pressure without the membrane having become fully extended i.e. when it bears against the dome-shaped housing component 5. Thus, irrespective of the water pressure in the line (i.e. whether this pressure is below or at the nominal line pressure with the initiation of water flow in the line) the flushing valve 3 remains open for a period of time sufficient to ensure adequate flushing throughflow of water, this time being in the main determined by the flow delay introduced by the provision of the flow restricting flowpath and by the maximum volume of the enclosure.

Thus, should the line pressure be below nominal line pressure, the valve remains open for a finite initial period of time after which it closes so as to prevent continuous leakage of water. On the other hand, should the line pressure be the nominal line pressure the valve will nevertheless also remain open for a finite adequate time for flushing to take place.

Once irrigation has been completed and the mains irrigation supply has been cut off the water in the enclosure defined between the extended membrane 8 and the adjacent surface of the tubular housing component 4 is forced out of the valve by the return displacement of the membrane 8 in a reverse flow, via the bore 18, flow restricting flowpath and tubular element 9 so as to be discharged through adjacent emitter units 2.

In the embodiment of a flushing valve shown in FIG. 3 of the drawings, a flushing valve 21 comprises a pair of housing components 22 and 23 (the housing component 23 being dome-shaped and corresponding to the housing component 5 in the embodiment shown in FIG. 2 of the drawings). The housing components are held together by means of respectively interengaging flange portions 24 and 25 which also serve to retain therebetween the edges of a flexible membrane 26.

The housing component 22 is formed with a cup-like portion 27 which merges, at its upper end, with the flange 24 and, at its lower end via an annular base portion 27a with an inlet coupling nipple 28.

Located within the cup-like portion 22 is a tubular body portion 29 the lower surface of which is formed with a flow restricting groove 30 of the kind, for example, formed in emitter units as disclosed in U.S. Pat. No. 4,209,133. A flow restricting flowpath is defined by the groove 30 and the adjacent surface of the annular base portion 27a and communicates, at an inlet end thereof, with a peripheral groove 31 formed in this base portion 27a. This groove 31 communicates via a set of filtering apertures 32, formed in the upper portion of the coupling nipple 28 with the interior of the coupling nipple 28. The tubular body 29 is formed with a peripheral valve seating 33 adjacent which is formed an outlet port 34 which is aligned with a corresponding port 35 formed in the cup-like housing 27, the aligned ports 34 and 35 constituting together a flushing valve outlet.

A flexible disc 36 (constituting valve obturating means) is juxtaposed with respect to the valve seating 33 and is secured at its edges to the tubular body 29 by means of a spring collar 37. An outlet end of the flow restricting flowpath communicates via a throughgoing bore 38 formed in the tubular body 29 with a region defined between the membrane 26 and the flexible disc 36, this region constituting a valve enclosure which is sealed off from the flushing valve outlet by means of the flexible disc 36.

Use of the flushing valve just described with reference to FIG. 3 of the drawings in an irrigation line such as the irrigation line 1 shown in FIG. 1 of the drawings in ensuring, initial flushing of the irrigation line and subsequently terminating this flushing after a finite period of time, determined inter alia, by the provision of the flow restricting flowpath, follows closely the mode of use described with reference to the valve shown in FIG. 2 of the drawings. Thus, with the initial flow of water in the line water flows directly from the line to the flushing valve outlet via the ports 34 and 35. At the same time a portion of the water flows through the flow restricting flowpath via the bore 29 into the valve enclosure defined between the membrane 26 and the disc 36 continuously distending the membrane 26 until the hydraulic pressure built up in this enclosure corresponds to that in the line whereupon the disc 36 reseats on the valve seating 33 and the flushing valve is closed to flushing throughflow.

Flushing valves in accordance with the present invention and as described with reference to FIGS. 1-3 of the drawings provide an effective, reliable means for ensuring that flushing throughflow always occurs at the initiation of an irrigation cycle irrespective of the water pressure in the line and that, irrespective of this water pressure, flushing ceases after a finite period of time. Furthermore the compact from the nature of the flushing valve in accordance with the invention wherein all its component parts are located within a housing thereby obviating the use of separate parts coupled together by tubing or the like renders it reliable in use and reduces substantially the possibilities of damage.

I claim:

1. An irrigation system flushing valve comprising a housing, a coupling inlet of said housing for coupling to an end of an irrigation line, a flushing valve outlet of said housing, a valve seating formed in said housing communicating with said inlet and with said outlet, valve obturating means juxtaposed with respect to said seating and displaceable with respect thereto from a sealing position wherein said inlet is closed with respect to said outlet to an open position wherein said inlet communicates with said outlet; an extensible membrane mounted in said housing and defining with said obturating means a valve enclosure located within said housing and sealed with respect to said outlet by said obturating means and flow restricting means effecting flow communication between said inlet and said valve enclosure; the arrangement being such that the hydraulic pressures in said valve enclosure and said inlet respectively act on opposite surfaces of said obturating means and when the hydraulic pressure in said valve enclosure equals or exceeds that in said inlet said obturating means is biased into said sealing position.

2. A flushing valve according to claim 1 wherein said housing comprises first and second housing components coupled together, a first of said housing components including said inlet and said outlet.

3. A flushing valve according to claim 2 wherein said first housing component is formed with a mouth portion remote from said inlet, a rim of said mouth constituting said valve seating, said outlet being defined adjacent to and external to said mouth.

4. A flushing valve according to claim 3 wherein said valve obturating means is formed of a flexible disc clamped at its rim with respect to said first housing component and juxtaposed at an annular inner portion thereof with respect to said valve seating.

5. A flushing valve according to claim 1 wherein said membrane is clamped at a rim thereof between said first and second housing components, said second housing component being formed with a venting aperture.

6. A flushing valve according to claim 2 wherein said flow restricting means includes a grooved element fitted in said first housing component and defining therewith a flow restricting flowpath, one end of which communicates with said inlet and an opposite end of which communicates with said valve enclosure.

7. A flushing valve acccording to claim 6 wherein a communicating bore is formed in said first housing component effecting communication between said valve enclosure and said opposite end of said flowpath.

8. A flushing valve according to claim 6 wherein said first housing component is formed as a tubular casing and wherein said grooved element is constituted by a tubular element friction fitted in said casing, the external wall of said element being grooved to define, with said casing, said flowpath.

9. A flushing valve according to claim 6 wherein said first housing component is substantially cup shaped, said grooved element being constituted by annular body located in said cup shaped component and having a groove which defines with an adjacent wall, a flow restricting flowpath, an inner annular rim of said body forming said valve seating, aligned ports formed in said body and said cup-shaped component constituting said outlet.

* * * * *